(12) United States Patent
Masuda et al.

(10) Patent No.: US 7,881,483 B2
(45) Date of Patent: Feb. 1, 2011

(54) TWO-WAY COMMUNICATIONS DEVICE HAVING A SINGLE TRANSDUCER

(75) Inventors: Masahisa Masuda, Beaverton, OR (US); Yasuhiro Kume, Tokyo (JP)

(73) Assignee: Matech, Inc., Lake Oswego, OR (US)

( * ) Notice: Subject to any disclaimer, the term of this patent is extended or adjusted under 35 U.S.C. 154(b) by 655 days.

(21) Appl. No.: 10/595,757

(22) PCT Filed: Nov. 10, 2004

(86) PCT No.: PCT/US2004/037409
§ 371 (c)(1),
(2), (4) Date: May 9, 2006

(87) PCT Pub. No.: WO2005/048572
PCT Pub. Date: May 26, 2005

(65) Prior Publication Data
US 2007/0133442 A1 Jun. 14, 2007

Related U.S. Application Data

(60) Provisional application No. 60/519,195, filed on Nov. 11, 2003.

(51) Int. Cl.
H04R 25/00 (2006.01)
(52) U.S. Cl. .................. 381/163; 379/406.08
(58) Field of Classification Search .............. 381/163; 379/406.08
See application file for complete search history.

(56) References Cited

U.S. PATENT DOCUMENTS

| | | |
|---|---|---|
| 1,224,331 A | 5/1917 | Smith |
| 3,114,105 A | 12/1963 | Neumiller |
| 3,370,236 A | 2/1968 | Walker |
| 3,781,492 A | 12/1973 | Cragg et al. |
| 3,829,624 A | 8/1974 | Goodin et al. |
| 2,955,140 A | 5/1976 | Stephens et al. |
| 4,002,860 A | 1/1977 | Terai et al. |
| 4,052,562 A | 10/1977 | Anderson |
| 4,065,646 A | 12/1977 | Schuh |
| 4,082,919 A | 4/1978 | Day |

(Continued)

FOREIGN PATENT DOCUMENTS

| | | |
|---|---|---|
| EP | 1213847 A | 6/2002 |
| EP | 0719018 B | 11/2002 |
| FR | 2755561 | 5/1998 |
| JP | 032833 | 4/1981 |
| JP | 2001060895 | 8/1999 |

(Continued)

OTHER PUBLICATIONS

Anderson, Hagood; "Simultaneous Piezoelectric Sensing/Actuation . . . "; J Sound VIB.; Jul. 28, 1994; Academic Press Ltd., London, Engl., vol. 174, No. 5; pp. 617-639.

(Continued)

*Primary Examiner*—Alexander Jamal
(74) *Attorney, Agent, or Firm*—Stolowitz Ford Cowger LLP

(57) ABSTRACT

Embodiments of the invention provide a small and economical two-way communications device that has both an excellent echo-cancellation function that substantially suppresses echoes over the entire frequency range and an excellent voice-operated exchange function that provides natural switching of conversation sounds while protecting against unnatural disconnection or echoes during conversation, even when a reception signal and a transmission signal are superimposed in a single transducer.

28 Claims, 10 Drawing Sheets

U.S. PATENT DOCUMENTS

| | | | |
|---|---|---|---|
| 4,087,636 A | 5/1978 | Akiyama et al. | |
| 4,156,800 A | 5/1979 | Sear | |
| 4,280,018 A | 7/1981 | Lazarus et al. | |
| 4,403,120 A | 9/1983 | Yoshimi | |
| 4,470,127 A | 9/1984 | Thompson | |
| 4,516,200 A | 5/1985 | Thompson | |
| 4,519,029 A | 5/1985 | Thompson | |
| 4,598,396 A | 7/1986 | Upp et al. | |
| 4,629,829 A | 12/1986 | Puhl et al. | |
| 4,635,285 A | 1/1987 | Coombes | |
| 4,644,330 A | 2/1987 | Dowling | |
| 4,668,842 A | 5/1987 | Yokoyama et al. | |
| 4,691,313 A | 9/1987 | Iwata | |
| 4,695,823 A | 9/1987 | Vernon | |
| 4,696,045 A | 9/1987 | Rosenthal | |
| 4,741,018 A | 4/1988 | Potratz et al. | |
| 4,833,719 A | 5/1989 | Carme et al. | |
| 4,837,829 A | 6/1989 | Lobb | |
| 4,912,758 A | 3/1990 | Arbel | |
| 4,941,123 A | 7/1990 | Thompson | |
| 4,972,491 A | 11/1990 | Wilcox | |
| 5,007,046 A | 4/1991 | Erving et al. | |
| 5,099,519 A | 3/1992 | Guan | |
| 5,115,471 A | 5/1992 | Liden | |
| 5,118,309 A | 6/1992 | Ford | |
| 5,168,522 A | 12/1992 | Simanis et al. | |
| 5,172,410 A | 12/1992 | Chace | |
| 5,202,918 A * | 4/1993 | White | 379/390.01 |
| 5,235,637 A | 8/1993 | Kraz et al. | |
| 5,265,264 A | 11/1993 | Dzunt et al. | |
| 5,287,406 A | 2/1994 | Kakuishi | |
| 5,307,405 A | 4/1994 | Sih | |
| 5,311,144 A | 5/1994 | Grasset | |
| 5,333,205 A | 7/1994 | Bogut et al. | |
| 5,335,286 A | 8/1994 | Carlson et al. | |
| 5,379,450 A | 1/1995 | Hirasawa et al. | |
| 5,393,989 A | 2/1995 | Gempe et al. | |
| 5,410,595 A | 4/1995 | Park et al. | |
| 5,420,930 A | 5/1995 | Shugart, III | |
| 5,465,298 A | 11/1995 | Wilkison et al. | |
| 5,471,666 A | 11/1995 | Sugiyama et al. | |
| 5,479,474 A | 12/1995 | Schwartzman et al. | |
| 5,586,193 A | 12/1996 | Ichise et al. | |
| 5,692,059 A | 11/1997 | Kruger | |
| 5,708,970 A | 1/1998 | Newman et al. | |
| 5,715,309 A | 2/1998 | Bartkowiak | |
| 5,824,966 A | 10/1998 | Leight | |
| 5,899,973 A | 5/1999 | Bandara et al. | |
| 6,104,824 A | 8/2000 | Ito | |
| 6,105,714 A | 8/2000 | Lindgren | |
| 6,138,790 A | 10/2000 | Leight | |
| 6,175,633 B1 | 1/2001 | Morrill et al. | |
| 6,311,052 B1 | 10/2001 | Lenz | |
| 6,357,292 B1 * | 3/2002 | Schultz et al. | 73/146.5 |
| 6,415,034 B1 * | 7/2002 | Hietanen | 381/71.6 |
| 6,480,610 B1 * | 11/2002 | Fang et al. | 381/321 |
| 6,795,549 B2 | 9/2004 | Ferianz et al. | |
| 2003/0134600 A1 | 7/2003 | Picone et al. | |
| 2003/0185403 A1 | 10/2003 | Sibbald | |
| 2004/0072540 A1 | 4/2004 | Wilson et al. | |
| 2004/0213427 A1 | 10/2004 | Yoon | |

FOREIGN PATENT DOCUMENTS

| | | |
|---|---|---|
| JP | 2001-060985 | 3/2001 |
| JP | 2001060895 | 3/2001 |
| RU | 2109408 | 4/1998 |
| WO | WO 97/27721 | 7/1997 |
| WO | WO 98/45937 | 10/1998 |

OTHER PUBLICATIONS

Sedra et al., "Microelectronic Circuits," Jul. 1990, second edition, p. 143.

Frank Kasparec, St. Poelten, Austria, Bilateral Speaker Networks Form Switchless Intercom, Electronics, vol. 53 p. 131, Jul. 3, 1980.

D5004 Cellular Telephone Echo Control Device, DSP Group, Inc. Jan. 1991, Rev. 2.0.

Telephone Coupling Transformer, Mouser Electronics, Feb. 16, 1995.

Written Opinion of the International Searching Authority for PCT/US04/37409; Date of mailing Aug. 29, 2005; ISA/US.

International Search Report for PCT/US97/22887; Date of mailing Jan. 4, 1999; ISA/US.

International Search Report for PCT/US01/22121; Date of mailing Nov. 11, 2002; ISA/EPO.

International Preliminary Examination Report for PCT/US01/22121; Date of compietion of report Jun. 6, 2003.

International Search Report for PCT/US97/22887; Date of mailing Jan. 4, 1999; ISA/US.

International Search Report for PCT/US02/33799; Date of mailing Jan. 24, 2003; ISA/EPO.

International Search Report for PCT/US04/37409; Date of mailing Aug. 29, 2005; ISA/US.

International Preliminary Report on Patentability for PCT/US04/37409; Date of completion of report May 11, 2006; IPEA/US.

Stolowitz Ford Cowger Listing of Related Cases, Sep. 2, 2009.

Anderson, Hagood; "Simultaneous Piezoelectric Sensing Actuation . . . "; J Sound VIB.; Jul. 28, 1994; Academic Press Ltd., London, Engl., vol. 174, No. 5; p. 617-639.

International Search Report for PCT/US09/38126; Date of mailing Jul. 22, 2009; ISA/US.

Written Opinion of the International Searching Authority for PCT/US09/38126; Date of mailing Jul. 22, 2009; ISA/US.

* cited by examiner

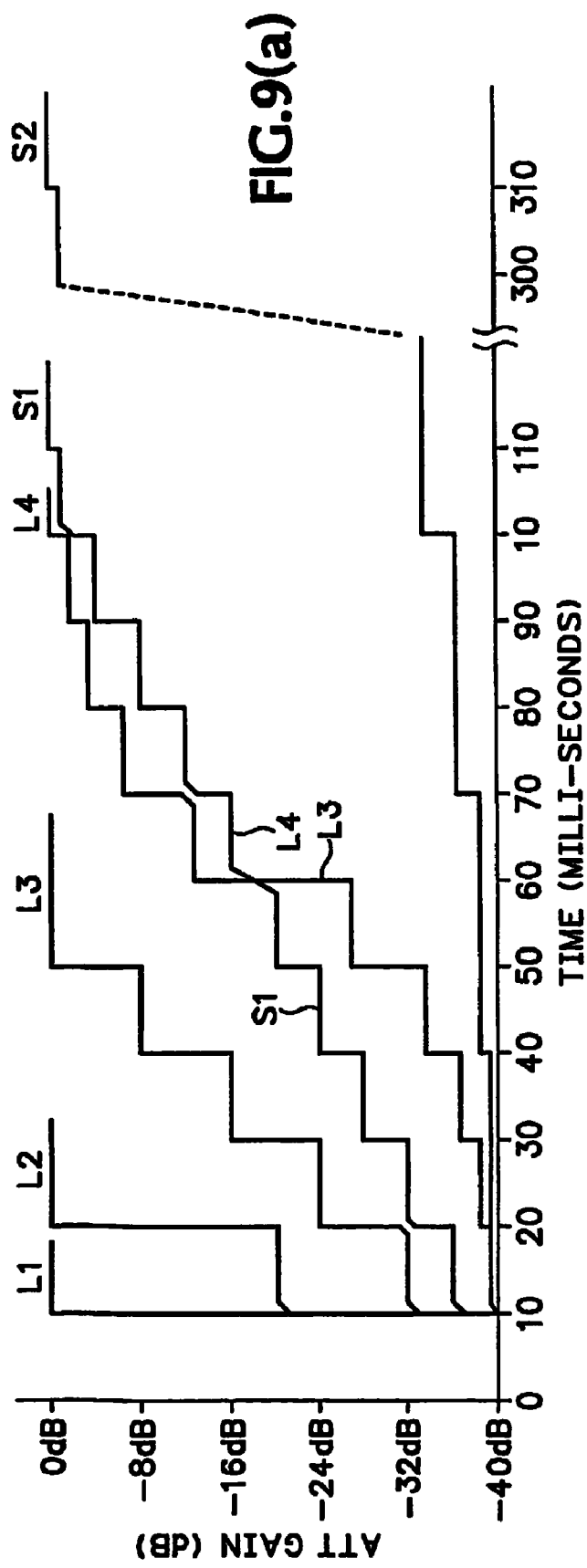

TWO-WAY COMMUNICATIONS DEVICE HAVING A SINGLE TRANSDUCER

BACKGROUND OF THE INVENTION

1. Technical Field of the Invention

This invention relates to a two-way communications device that uses the vibrations of an eardrum membrane caused by a user's voice, and more particularly, to a two-way communications device that uses one transducer for both receiving and sending voice. The communication device also serves as a high-level echo canceller (EC) and as a high-level voice-operated exchanger (VOX).

2. Description of the Related Art

A generally known device used for two-way voice communication includes a microphone and an earphone. The microphone and earphone are integrated as a headset providing "hands free" operation for the user. One problem with these headsets is that the microphone also picks up ambient noises around the user.

As an alternative, a user's voice is picked up not at the mouth, but through bone conduction within the user's ear canal. This provides "mouth-free" operation for the user (i.e., the user can keep the periphery of his or her mouth free). Voice signals received through bone conduction suppress peripheral noises to some degree, however, the sound quality of voice signals detected via bone conduction generally have bad sound quality.

Some headsets have been proposed that use two transducers. A first transducer is used as a microphone and a second transducer is used as an earphone. The two transducers are inserted into a user's right and left ears. The microphone transducer detects the user's voice via vibrations from the membrane in the user's eardrums. In this two transducer system, ambient noises around the user are naturally suppressed allowing the microphone to provide better sound quality.

The use of single transducer headsets has also been advanced. The idea is to use a single transducer element for both voice transmission and reception. With this method, only one earplug is needed. Since the user's other ear does not require an earphone, the user can also hear sounds and voices around him or her.

It is important for these devices to have an echo-cancellation (EC) function. The echo cancellation prevents reception signals from being superimposed on voice transmission signals. In some cases, the headset also includes a voice-operated exchanger (VOX). The VOX switches between voice transmission and reception modes according to the presence or absence of transmission and/or reception signals.

Japanese Patent Application Publication No. 2001-60895 discloses a transmission-and-reception circuit that utilizes an all-analog circuit that is equipped with echo-cancellation and a voice-operated exchanger. A bridge circuit in the disclosure combines an amplifier and comparator with an embedded single transducer.

However, it is difficult and expensive to achieve reliable and satisfactory EC and VOX performance with these types of analog circuits. Because of these difficulties, the above-mentioned single transducer transmission-and-reception circuits have not yet come into practical use.

When designing an EC circuit, it is necessary to simulate the actual impedance characteristics of the transducer. Namely the characteristics of the transducer when inserted into a particular user's external ear canal must be simulated, in order to balance the EC circuit with the actual transducer. However, it is difficult to simulate this impedance due to the inductive properties of the transducer. Furthermore, the actual impedance of the transducer varies over time and also varies according to the individual user and according the surrounding environment.

An ordinary analog-simulation circuit consists of capacitors (Cs) and resistors (Rs). The analog circuit can be approximately balanced at a single specific frequency by tuning two variable elements. It is impossible to achieve balance over an entire frequency range. In theory it might be possible to achieve balance over the entire frequency range, if an inductance element is included in an analog-simulation circuit. However, using an inductance element is bulky and expensive. It is also very difficult to tune an inductance element to conform with the varying transducer characteristics. This makes using analog inductor circuits impractical for headset applications.

In the case of half-duplex two-way communications, a VOX is essential. The VOX monitors reception and transmission voice signals, then must determine in less than a few milliseconds whether to select a transmission mode or a reception mode.

During a conversation, the received and transmitted voice signals continually vary in magnitude and sometimes are also intermittently disconnected. Therefore, it is necessary continuously accumulate and process voice data up to the time when a determination is made whether to switch to the reception mode or the transmission mode. This determination process is difficult, especially when using an analog-circuit.

Embodiments of the invention address these and other disadvantages of the conventional art.

SUMMARY OF THE INVENTION

For the purpose of solving the various above-mentioned problems, one embodiment of the invention provides a two-way communications device that has improved EC and/or VOX performance. One embodiment of a two-way communication device includes a single transducer element, a microprocessor unit (MPU), a digital circuit such as a digital-signal processor (DSP) combined with an analog circuit.

Another embodiment consists of a small and economical two-way communication device having a single transducer. The device clearly transmits a user's voice without also transmitting ambient environmental noises immediately around the user. The user is also capable of hearing voices and sounds around him or her, in addition to the voice from the other party being communicated with the communications device.

Even when reception signals and transmission signals are superimposed in a transducer, embodiments of the invention provide an excellent echo-cancellation function, substantially stopping the reception signal from leaking into the transmission signal (echo) over the entire voice frequency range.

Furthermore, in the case of half-duplex communications, embodiments of the invention have improved VOX operation that naturally switches between transmission and reception modes without causing unnatural interruptions or disconnections in the conversation.

BRIEF DESCRIPTION OF THE DRAWINGS

Embodiments of the invention will be more readily understood with reference to the following drawings.

FIG. 9($a$) is a plot of various gain-transition curves for an attenuator in the VOX of a half-duplex two-way communications device according to embodiments of the invention.

FIG. 9($b$) is a table showing the actual results of a sensibility test using the gain-transition curves of FIG. 9($a$).

DEFINITIONS

| | |
|---|---|
| MPU | Microprocessor unit |
| EC | Echo-canceller |
| VOX | Voice-operated exchanger |
| AGC | Automatic gain controller |
| L | Piezoelectric transducer |
| R1, R2, R3, R4 | Resistor (also indicating resistance value) |
| R | Variable resistor with an intermediate tap "t" |
| C1, C2 | Capacitor (also indicating capacitance value) |
| AMP1, AMP2, AMP3 | Amplifier |
| D/A1, DA2, D/A3 | Digital to Analog (D/A) converter |
| A/D1, A/D2 | Analog to Digital (A/D) converter |
| BUF1, BUF2 | Buffer |
| ADD | Adder |
| FIL, FIL1, FIL2 | Filter |
| k-Calculator, k1-Calculator, k2-Calculator | Calculator for filter parameters k, k1, k2 |
| SW1-SW5, SW | Switch |
| ATT1, ATT2 | Attenuator |
| ATT3, ATT4 | Analog attenuator |
| LPF1, FPF2 | Low-pass filter |
| Rx | Reception terminal (also, reception signal) |
| Tx | Transmission terminal (also, transmission signal) |

DETAILED DESCRIPTION OF THE INVENTION

Figure 1:
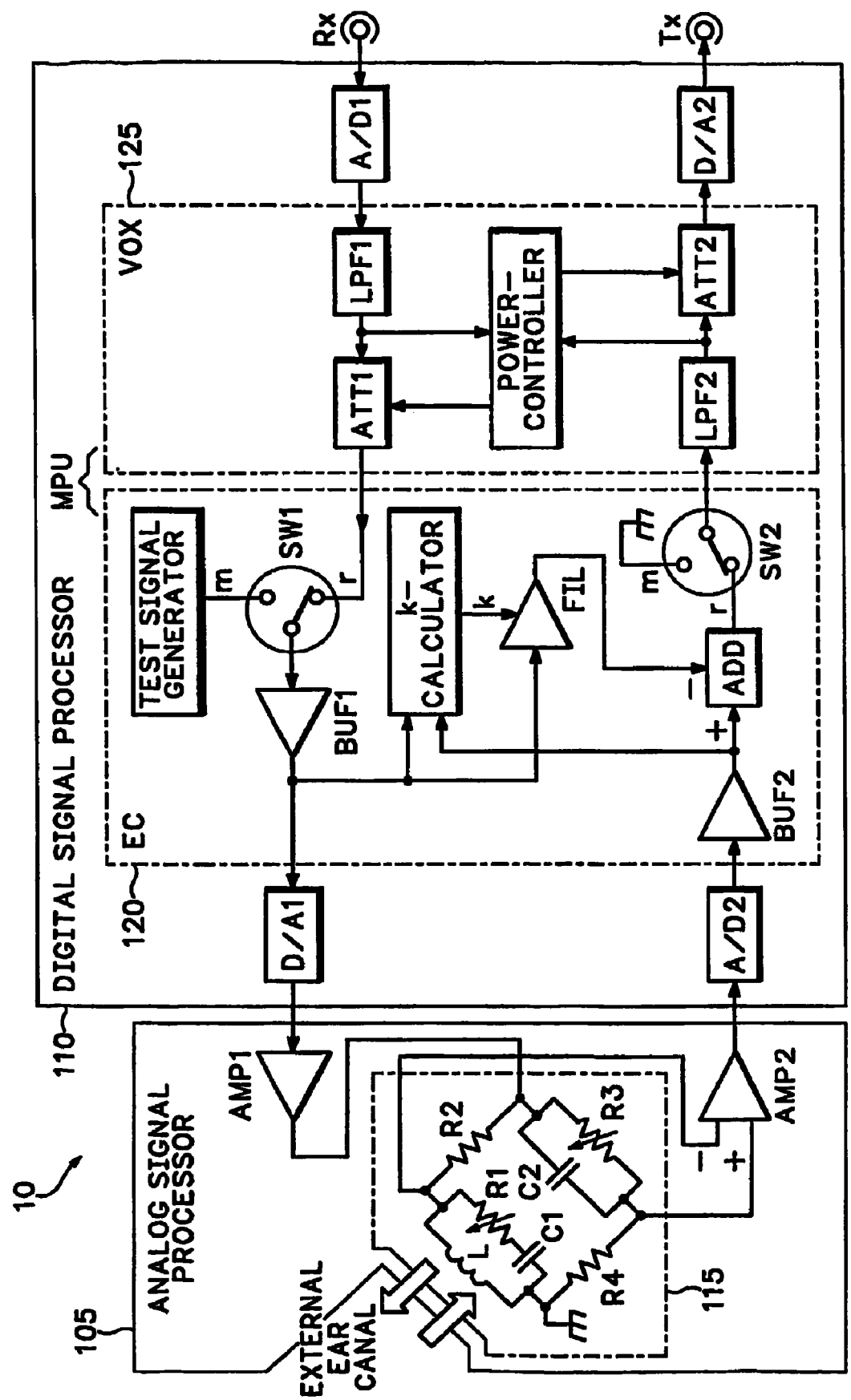
FIG. 1 is a block diagram illustrating a full duplex, two-way communications device according to an embodiment of the invention.

FIG. 1 is a block diagram illustrating a full duplex, two-way communications device 10 according to one embodiment of the invention. Device 10 includes an analog signal processor (ASP) 105 with a piezoelectric transducer (or coil L) and a digital signal processor (DSP) 110. The DSP 110 includes a first digital-to-analog (D/A) converter D/A1, a first analog-to-digital (A/D) converter A/D1, a second A/D converter A/D2, an MPU, and a second D/A converter D/A2. The MPU can be embodied with a single DSP and/or CPU or a plurality of DSPs and CPUs.

For convenience, and throughout the rest of the detailed description, the analog-to-digital converters found in the various described embodiments may simply be referred to as converter A/D1, converter A/D2, etc, where the number following the "A/D" differentiates between converters found in the same embodiment. Likewise, the digital-to-analog converters found in the various described embodiments may be referred to as converter D/A1, converter D/A2, etc. Using this notation, both the type of converter and the specific converter being described is apparent.

Returning to FIG. 1, the piezoelectric transducer (L) in the ASP 105 is inserted into an external ear canal of a user and functions to convert voltage corresponding to a reception signal Rx into vibrations (acoustic waves). The transducer L also functions to convert the vibrations (acoustic waves) received from the external ear canal into an electromotive force corresponding to a transmission signal Tx. The piezoelectric transducer L is electrically equivalent to an inductive element, and therefore is represented throughout the disclosure as a coil L.

An arrow extending from the coil L toward the external ear canal shows the vibrations (acoustic waves) corresponding to the voltage applied to the coil L. The other arrow extending in the reverse direction represents air vibrations in an eardrum membrane caused by the user's voice that generate a corresponding electromotive force within the coil L.

At a reception terminal, a reception signal Rx is processed sequentially through the converter A/D1, VOX 125, echo-controller (EC) 120, and converter D/A1 and then sent to the ASP 105 as a reception-signal input. The transmission-signal output from the ASP 105 is processed sequentially through the converter A/D2, EC 120, VOX 125, and converter D/A2 and then output as a transmission terminal as a transmission signal Tx.

The VOX 125 includes first and second attenuators ATT1 and ATT2, as well as first and second low pass filters LPF1 and LPF2, along with a power controller. The power controller measures the power of the reception signal Rx and the transmission signal Tx in order to control the gains of the first and second attenuators ATT1 and ATT2. This is done to place the outputs of the first and second attenuators ATT1 and ATT2 in a predetermined value range. The VOXs 225, 325, 425, 525, and 625 illustrated in FIGS. 2, 3, 4, 5, and 6, respectively, have the same components as VOX 125 and thus a description of those VOXs will not be repeated.

In alternative embodiments of the invention, the VOX 125 may have the same components as shown in FIG. 1, but may be alternatively referred to as an automatic gain controller (AGC).

The receive and transmit terminals are connected to each other via the piezoelectric transducer L. In normal operation a so-called "echo" is generated that contains some parts of the reception signal Rx superimposed on the original transmission signal Tx. It is necessary to suppress this echo using echo-cancellation techniques. In this embodiment, the ASP 105 performs a first echo control function, while the echo controller 120 performs a second echo control function.

The ASP 105 is equipped with a bridge circuit 115 that includes the piezoelectric transducer L, resistors R1, R2, R3, and R4, and capacitors C1 and C2.

A first side of the bridge circuit 115 includes the piezoelectric transducer L. The second and fourth sides, which are adjacent to the first side, include the second and fourth resistors R2 and R4, respectively. The connection node between the first and fourth sides is grounded.

The output of the converter D/A1 is sent to the connection node between the second and third sides of bridge circuit 115 as the reception-signal input via a first amplifier AMP1. A differential potential between a node at the first and second sides and a node at the third and fourth sides is applied to a second amplifier AMP2. The output of AMP2 is transmitted to the converter A/D2 as the transmission-signal output of the ASP 105.

The first side of the bridge circuit 115 includes the piezoelectric transducer L in parallel with a series combination of a first resistor R1 and a first capacitor C1. The third side of the bridge circuit 115 is positioned opposite the first side and includes a third resistor R3 in parallel with a second capacitor C2.

The values of the resistors R1 and R3 are variable and can be controlled so that both the phase and the gain are balanced for a specific value of L (i.e., the value of L when the transducer is inserted into either the right or left external ear canal of a specific user), with respect to at least a single specific frequency.

Superposition of the reception-signal input is prevented by connecting the differential inputs of the amplifier AMP2 to the opposite nodes of bridge circuit 115 (echo-cancellation). As a result, only the electromotive force on the transducer L appears as the differential input. For example, 600 Hz may be selected as a specific frequency. Using only the bridge circuit 115, the leaking of reception signals (i.e., echoes) may not necessarily be prevented with respect to all the other audible frequencies to either side of the selected specific frequency.

Echo Controller

When the EC 120 is in regular operation, the first and second switches, SW1 and SW2, are both connected to the "r" side of the switch. During regular operation, a reception signal is output from the EC 120 via a first buffer BUF1, while a transmission signal is output from the converter A/D2 via a second buffer BUF2. A filter FIL is provided for simulating transmission characteristics from the converter D/A1 to the buffer BUF2 via the ASP 105.

The reception-signal input is simultaneously transmitted to the converter D/A1 and processed by the filter FIL. The resultant output of the filter FIL is subtracted from the transmission-signal input by an adder ADD, and the resultant output is transmitted to the VOX 125 as the transmission-signal output from BUF2 into the EC 120.

The EC 120 can execute a simulation of ASP 105 over an entire audio frequency range. Thus, the part of the transmission-signal input that is due to leakage of the reception signal (the echo) is equal to the output of the filter FIL. This means that the output from the adder ADD contains no reception-signal components, providing improved echo-cancellation.

In the EC 120, the parameter k for the filter FIL is automatically set by a preinstalled program (not shown). The maximum value of k is equal to the number of taps in the filter, for example, 256. The parameter k is set either immediately after the piezoelectric transducer L is attached to an object such as an external ear canal. Alternatively, the parameter k is set periodically when the transducer L is attached in the external ear canal. In another embodiment, the parameter k is set each time a reception signal and/or a transmission signal is generated.

The electrical characteristics of the transducer L, when looked at from the two-way communications device, are slightly different and vary depending on the structure and environment of the particular external ear canal. In other words, the electrical characteristics may vary depending on the temperature and degree of moisture in the external ear canal during communication.

During measurement (test) operation of the EC 120, when the parameters k of the filter FIL are to be set, the switches SW1 and SW2 are connected to the "m" terminal and the test signal generator generates a test signal. The test signal is a digital signal that can represent at each impulse any one of the following audio signals, an actual voice produced during conversation, a natural voice, a reception sound, a musical sound, a diffusion code signal, or a tone sweep signal.

Thus, instead of a reception signal from the VOX 125, the test signal generated by the test signal generator is transmitted to the converter D/A1 via the buffer BUF1. The resultant output of the converter A/D2 and the test signal are both supplied, via the buffers BUF1 and BUF2, respectively, to a k-calculator. The k-calculator then generates the k parameters used in the filter FIL in accordance with a predetermined method of calculation.

The "m" side of the switch SW2 is grounded, the transmission-signal input to the VOX 125 is also grounded. Therefore, any output of the adder ADD during calculation of the k-parameters will not leak as noise to the transmission-signal Tx.

If the selected test signal output from the test signal generator is an impulse, the predetermined calculation process treats the entire frequency range equally, and the calculation is relatively simple. However, if some particular frequency characteristics are required, more desirable echo-cancellation can be achieved by using another test signal, such as an actual voice signal, and a corresponding k-parameter calculation process conducted.

In such calculations, it is necessary to execute complicated calculations such as discrete fast Fourier transforms (FFT) in a shorter time than the period corresponding to that of the maximum frequency of a voice. The invention fully utilizes the progress of technology such that the most current MPU can execute the above-mentioned calculations. The power consumption of such an MPU is low enough so that entire embodiment of the invention may be accommodated in an earplug housing.

The VOX 125 receives a reception signal at the first low-pass filter LPF1 that is output from the converter A/D1, and receives a transmission signal from LPF2 that is output from the EC 120. The VOX 125 transmits the reception signal Rx to the EC and transmits the transmission signal Tx to the converter D/A2 through the first and second attenuators ATT1 and ATT2, respectively. The VOX 125 measures the power of the reception signal Rx and the transmission signal Tx using the power-controller. The power-controller controls the gains of the attenuators ATT1 and ATT2 so that the power output from the attenuators ATT1 and ATT2 match predetermined power values.

Figure 2:
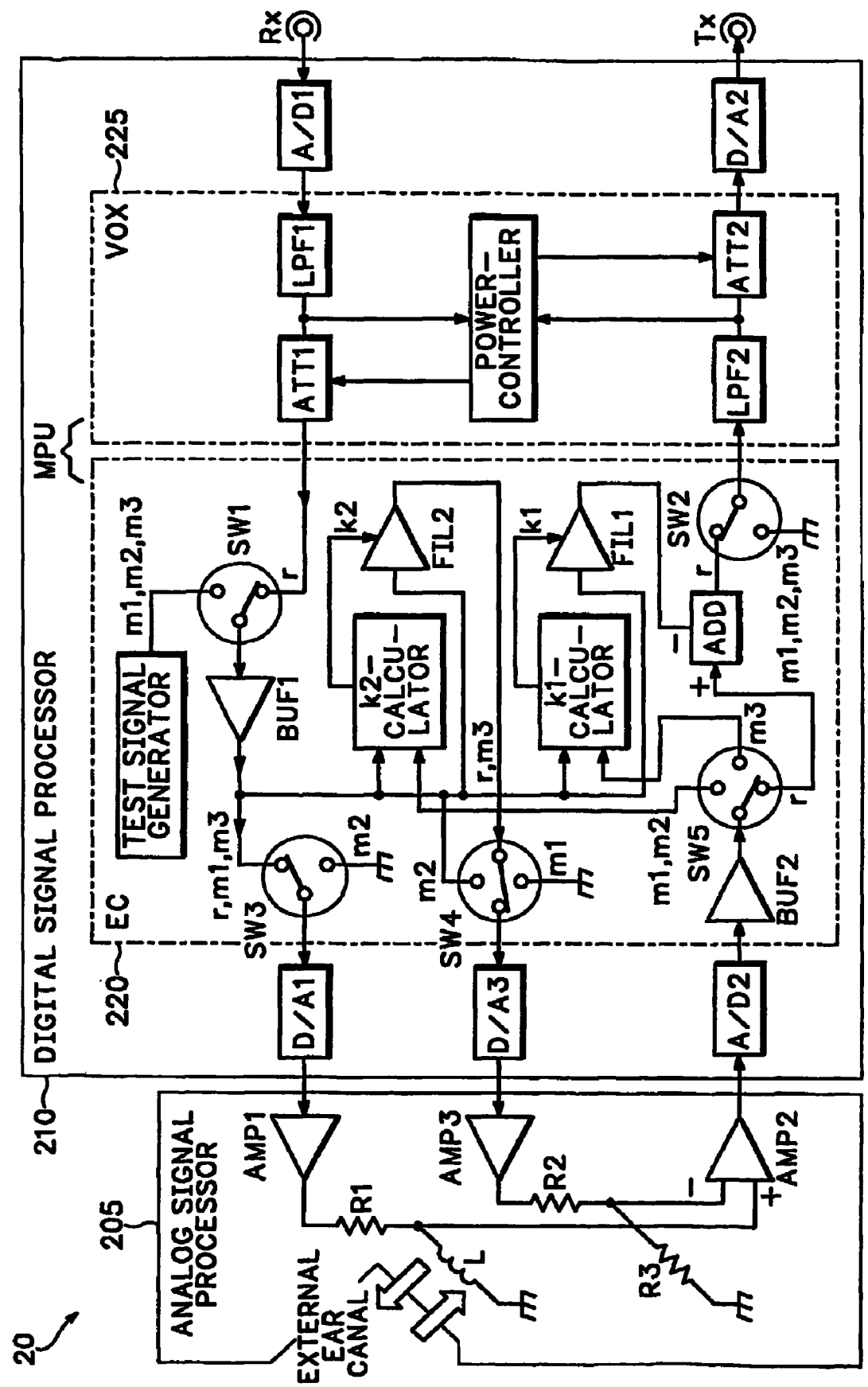
FIG. 2 is a block diagram illustrating a full duplex, two-way communications device according to another embodiment of the invention.

FIG. 2 is a block diagram illustrating a full duplex, two-way communications device 20 according to another embodiment of the invention. In the following discussion, the portions of FIG. 2 that differ from FIG. 1 will be emphasized, while those portions that are the same as FIG. 1 are given lesser mention because they function in a similar manner as explained above for FIG. 1. In other words, the ASP 205 and the EC 220 of FIG. 2 will be emphasized because they differ from the ASP 105 and the EC 120 of FIG. 1.

In the ASP 205, the output of the converter D/A1 is sent to one end of the resistor R1 as reception-signal input via the amplifier AMP1. One end of the piezoelectric transducer L is connected to the other end of the resistor R1, while the other end of piezoelectric transducer L is grounded.

The connection node of the piezoelectric transducer L and the resistor R1 are connected to the positive (+) differential input end of the second amplifier AMP2, while the output of the third converter D/A3 is connected, via a third amplifier AMP3 and a load circuit, to the negative (−) input end of the amplifier AMP2. The output of the amplifier AMP2 is transmitted to the converter D/A2 as the transmission-signal output of the ASP 205.

The load circuit of the ASP 205 includes a serial circuit of resistors R2 and R3. One end of the resistor R2 is connected to the output of the amplifier AMP3, one end of the resistor R3 is grounded, and the connection node of the resistors R2 and R3 is connected to the negative (−) input end of the amplifier AMP2. Preferably, the resistance values of the resistors are set such that R2 is equal to R1 and R3 is equal to the representative impedance of the piezoelectric transducer L. For example, $R3=2\pi*f0*L$; where $f0=600$ Hz and L is the inductance in Henrys.

As shown in FIG. 2, the EC 220 includes first through fifth switches SW1-SW5, all of which are connected at an "r" side if the EC 220 is in a regular operation. For example, when the circuit is used for receiving and transmitting audio signals. The EC 220 further includes first and second filters FIL1 and FIL2.

The EC 220 receives a reception signal that is output from attenuator ATT1 in the VOX 225. The reception signal is subsequently buffered by buffer BUF1 and transmitted to the converter D/A1. The EC 220 also transmits the buffered reception signal to the converter D/A3 through the second filter FIL2, and to the adder ADD through the first filter FIL1.

At a second buffer BUF2, the EC 220 receives a transmission signal that is output from the converter A/D2. The output of the first filter FIL1 is subtracted from the buffered transmission signal at the adder ADD, and the difference is output to the VOX 225 as the transmission-signal output from the EC 220.

The second filter FIL2 is set so that transmission characteristics from the output node of the buffer BUF1, through the filter FIL2, the converter D/A3, the amplifier AMP3, the load circuit (resistors R2 and R3), the amplifier AMP2 (via its negative (−) input end), and the converter A/D2, up to the output node of the buffer BUF2 simulate the transmission characteristics from the output node of the buffer BUF1, through the converter D/A1, the amplifier AMP1, the resistor R1, the amplifier AMP2 (via the one (+) input), and the converter A/D2, up to the output node of the buffer BUF2.

The first filter FIL1 is set in such a manner to simulate the transmission characteristics from the output node of the first buffer BUF1 up to the second buffer BUF2, via (i) the ASP 205 through two paths (of which one starts at the converter D/A1, while the other path starts at the second filter FIL2 and the converter D/A3), (ii) the differential amplifier AMP2, at which the two paths join, and (iii) the converter A/D2.

In the case of measurement (test) operation of the EC 220, when the parameters of the first and second filters are set, the operation is done in three sequential steps, represented with the switches SW1 to SW5 as first, second, and third steps m1, m2, and m3, respectively. During this operation, the switches are first connected to the m1 terminal, then to the m2 terminal, and lastly to the m3 terminal.

For example, the switch SW1 remains connected to the same terminal for the first, second, and third steps. On the other hand, switch SW4 starts at the m1 terminal for the first step, switches to the m2 terminal for the second terminal, and finally to the m3 terminal for the third step. In any case, during measurement operation with the EC 220, a test signal from a test-signal generator, instead of a reception signal from the VOX 225, is provided to the buffer BUF1. These steps will be described in further detail below.

In the first step, a test signal output from the test signal generator is transmitted to the ASP 205 through the buffer BUF1 and the converter D/A1, whereby the input of the converter D/A3 is grounded through SW4 (a value of zero is input). The resultant output of the buffer BUF2 is stored as Signal 1.

In the second step, the same test signal is transmitted to the ASP 205 through the signal path represented by the buffer BUF1 and the converter D/A3, whereby the input of the converter D/A1 is grounded through SW3 (a value of zero is input), and the resultant output of the buffer BUF2 is stored as Signal 2.

Signal 1, Signal 2, and the test signal are then processed in a predetermined calculation process by a k2-calculator. This operation sets the parameters k2 of the second filter FIL2.

In the third step, the test signal is transmitted to the ASP 205 through the signal path represented by the buffer BUF1 and the converter D/A1. The test signal is also transmitted to the ASP 205 through the signal path represented by the buffer BUF1, the filter FIL2, and the converter DA/3. The resultant output signal of the buffer BUF2 and the test signal are then processed with another predetermined calculation process by a k1-calculator. This operation sets the parameters k1 of the first filter FIL1.

The second filter FIL2, which is set in the first and the second steps, simulates the case where the input voltage of the amplifier AMP2 has a large amplitude, while the first filter FIL1, which is set in the third step, simulates the case where the input voltage of the amplifier AMP2 has a small amplitude.

In this embodiment, because the EC 220 utilizes a preinstalled program to execute all of the adjustments required for echo-cancellation, there is no need for the ASP 205 to have a bridge circuit, and thus hardware can be simply designed and manufactured without adjustment, and the size of hardware can be easily minimized, all of which will bring large benefits.

Using the processes described above, the EC 220 may automatically set the filters FIL1 and FIL2 immediately after the piezoelectric transducer is inserted into an external ear canal of a user. The EC 220 may also periodically set the filters FIL1 and FIL2 while the transducer is inserted in the ear canal. Alternatively, the filters FIL1 and FIL2 may be set each time that a reception signal or/and a transmission signal is started. In this manner, the variation of acoustic characteristics, including those caused by structural differences between the external ear canals of different users, are reflected in the setting of the filters FILL and FIL2.

Figure 3:
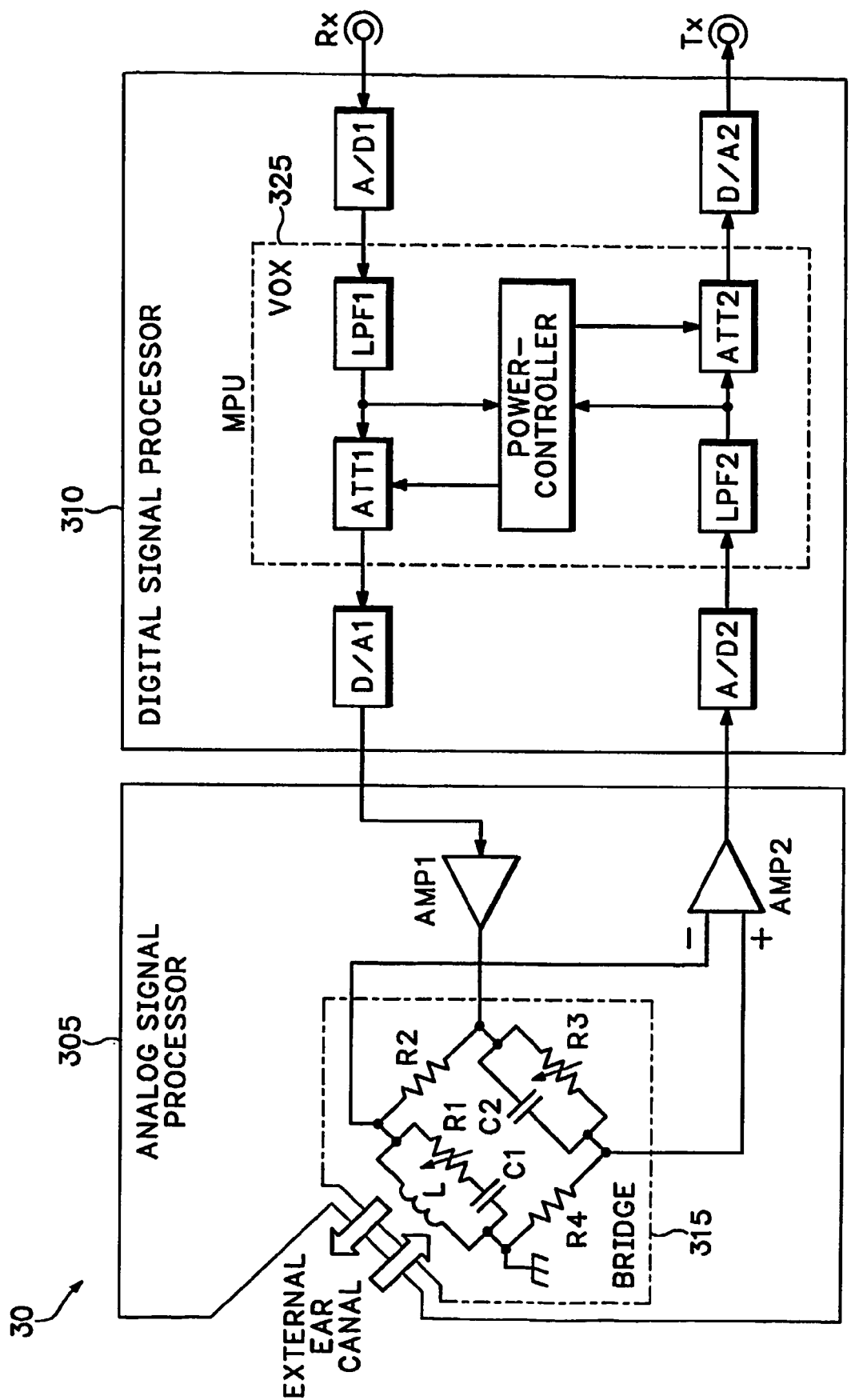
FIG. 3 is a block diagram illustrating a half-duplex, two-way communications device according to yet another embodiment of the invention.

FIG. 3 is a block diagram illustrating a half-duplex, two-way communications device 30 according to yet another embodiment of the invention. The DSP 310 has a different structure than the DSP 110 of FIG. 1. The MPU only has a VOX 325 that is used for half-duplex communications. There is no echo-cancellation function. However, the ASP 305 is equivalent to the ASP 105 of FIG. 1.

In this embodiment, the ASP 305 performs the echo-cancellation function, and the VOX 325 switches between transmission and reception modes. In this embodiment, it is generally not possible to achieve the same high-quality levels of echo-cancellation such as produced by the EC 120 of FIG. 1 and EC 220 of FIG. 2, and a slight amount of echo may remain. In this embodiment, however, the VOX 325 reduces gain in the attenuators ATT2 or ATT1 at the time of reception or transmission, respectively. Thus, for practical purposes, the echo may be almost totally suppressed.

The reduced operations of the MPU means a less complex and less expensive processing unit can be used providing more-economical manufacturing. Alternatively, when an equivalent MPU is used, the surplus processing capacity can be used for improving the performance of the VOX 325.

The VOX 325 receives and monitors reception signals from the reception terminal Rx via the converter A/D1 and receives and monitors transmission signals via the converter A/D2. The VOX 325 determines the presence of a reception signal and/or a transmission signal, and decides whether to switch the operation mode either to reception mode (earphone mode) or to transmission mode (microphone mode). Then, using a predetermined procedure, the VOX 325 processes and transmits the reception signal to the converter D/A1 (to the next stage), while processing and sending the transmission signal, via the converter D/A2, to the transmission terminal Tx.

Several examples of how the VOX 325 determines when to switch between earphone mode and microphone mode are given below. Each of the examples may be implemented by an program installed in the digital signal processor 310.

As a first example, only the reception signal is monitored. The operation mode is switched to the reception mode if a reception signal is present, and to the transmission mode in the absence of a detected reception signal.

In a second example, only the transmission signal is monitored. The operation mode is switched to the transmission mode if a transmission signal is present, and maintained in the reception mode in the absence of a transmission signal.

As another example, both the reception and transmission signals are monitored. The device is switched to the reception mode only when a reception signal is present, and switched to the transmission mode when a transmission signal is present.

Alternatively, in the presence of both the reception signal and the transmission signal or the absence of both the reception signal and the transmission signal, the operation mode is set to one mode or the other based on the statistical characteristics of the operation modes explained above.

More particularly, the VOX 325 includes first and second low-pass filters LPF1 and LPF2, first and second attenuators ATT1 and ATT2, and a power-controller. After a reception signal and a transmission signal are processed by the low-pass filters LPF1 and LPF2, either or both of the signals are supplied to the power-controller. The signals from LPF1 and LPF2 are supplied to the attenuators ATT1 and ATT2, respectively, and then transmitted to the converters D/A1 and D/A2, respectively.

The amplitude value(s) of either or both the reception and transmission signal are averaged (for example, square-averaged, or absolute-value averaged) during a predetermined time period T1 by the power-controller. This averaging is used for determining the power of each signal. The power values are then compared with predetermined power threshold(s). The presence or absence of a reception signal and/or transmission signal is determined based on the comparison, and the next operation mode accordingly selected.

If the reception mode is selected, the gain of the attenuator ATT1 moves the gain of the reception signal towards 1 and the gain of the attenuator ATT2 moves the gain of the transmission signal towards 0. If the transmission mode is selected, the gain of the attenuator ATT1 moves the gain of the reception signal towards 0 and the gain of the attenuator ATT2 moves the gain of the transmission signal towards 1.

The cumulative effect of a plurality of decisions made during the time period T1 can be determined. That is to say, when the reception mode is continued, the gain of the reception signal continues to increase according to a predetermined gain-transition curve. If the decision is made to switch to the transmission mode, the gains decrease in reverse direction according to the predetermined gain-transition curve.

If the next operation mode is selected based only on the determination of the presence or absence of one of the reception and transmission signal(s), and if the predetermined time period T1 is short, excess mode switching will frequently occur at every natural momentary pause during a conversation. In contrast, if the interval T1 is too long, the mode is not successfully switched between transmission and reception. Thus, the solution window (an appropriate range of values) for T1 may not be found, even when the predetermined power thresholds are adjusted as accurately as possible.

However, according to this embodiment, the gains of the attenuators ATT1 and ATT2 are changed only slightly at every natural momentary pause. Thus switching is actually in effect only after the same decision is made over a number of determinations, resulting in natural and normal switching.

In some embodiments, the shape of the predetermined gain-transition curve are discrete transitions made in the form of an S-shaped staircase. In other words, the gain change per unit decision is small near the final value 0 or 1, while it is large in the intermediate range, giving the staircase an overall S-shape. Examples of gain-transition curves that exhibit this type of S-shape can be seen in S1 and S2 of FIG. 9(a).

FIG. 9 shows the results of an evaluation test of the quality of a communicated voice when various kinds of gain-transition curves are applied to the switching of transmission and reception signals in a certain natural conversation. FIG. 9(a) is a plot of various gain-transition curves for an attenuator in the VOX of a half-duplex two-way communications device according to embodiments of the invention. FIG. 9(b) shows the results of a sensibility evaluation of the quality of a communicated voice using the gain-transition curves of FIG. 9(a), where "A" indicates good, "B" is fair, and "C" is bad.

The power of a voice signal in natural conversation (here defined as the average of squared amplitudes) is changed as another variable in the evaluation. Also, in this test, the predetermined time period T1 for obtaining an average value of squared amplitudes is set to 10 milliseconds, while the predetermined power threshold is set to 15 dBm0, where the dBm0 units indicate power in dBm (dB referenced to one milliwatt) measured at a zero transmission level point.

According to the evaluation, when linear-staircase-type curves L1 to L4 of FIG. 9(a) are used, the quality of a communicated voice is bad ("C") regardless of the step size D (delta) of 40 dB to 4 dB. Only when S-shaped staircase type curves S1 and S2 are used can good ("A") or fair ("B") quality can be secured near a normal voice-power level (15 dBmO). However, if the S-shaped staircase type curve S2 is used, where the transition of gain from 0 to 1 exceeds more than 300 m/sec, a slight echo might remain.

Figure 4:
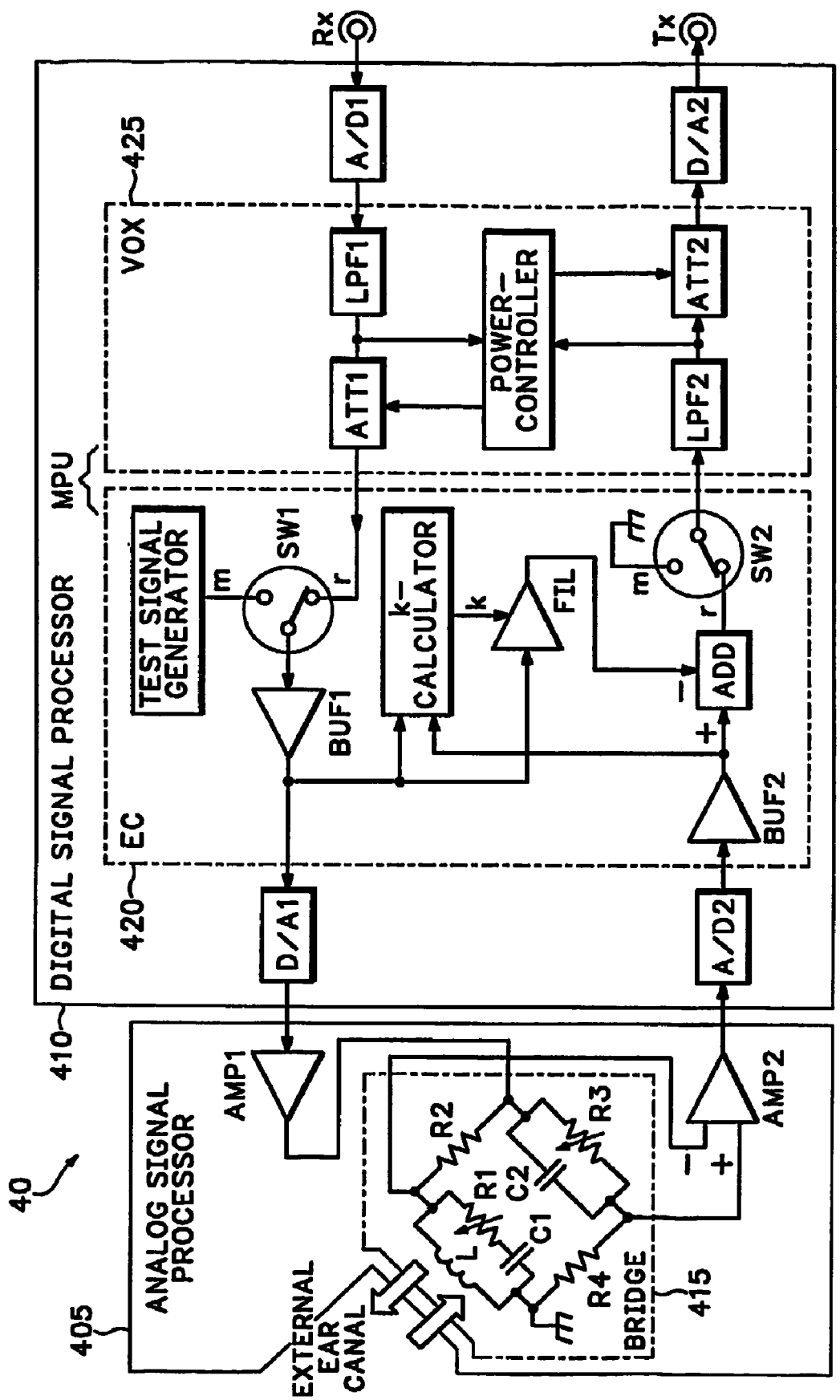
FIG. 4 is a block diagram illustrating a half-duplex, two-way communications device according to still another embodiment of the invention.

FIG. 4 is a block diagram illustrating a half-duplex, two-way communications device 40 according to still another embodiment of the invention. In this embodiment, the EC 420 is equivalent to EC 120 of FIG. 1. The DSP 410 also includes a VOX 425 that is the same as the VOX 325 of FIG. 3. Thus, a half-duplex, two-way communications device 40 of higher echo-cancellation quality than device 30 of FIG. 3 can be obtained.

As possible alternative embodiments, the amplifier AMP2 of the ASPs 105, 305, and 405 of FIGS. 1, 3, and 4, respectively, may be configured by tandemly connecting a differential amplifier having a gain of about 1, an amplifier having a gain of about 600, and a low-pass filter having a low-frequency gain of about 1.

Figure 5:
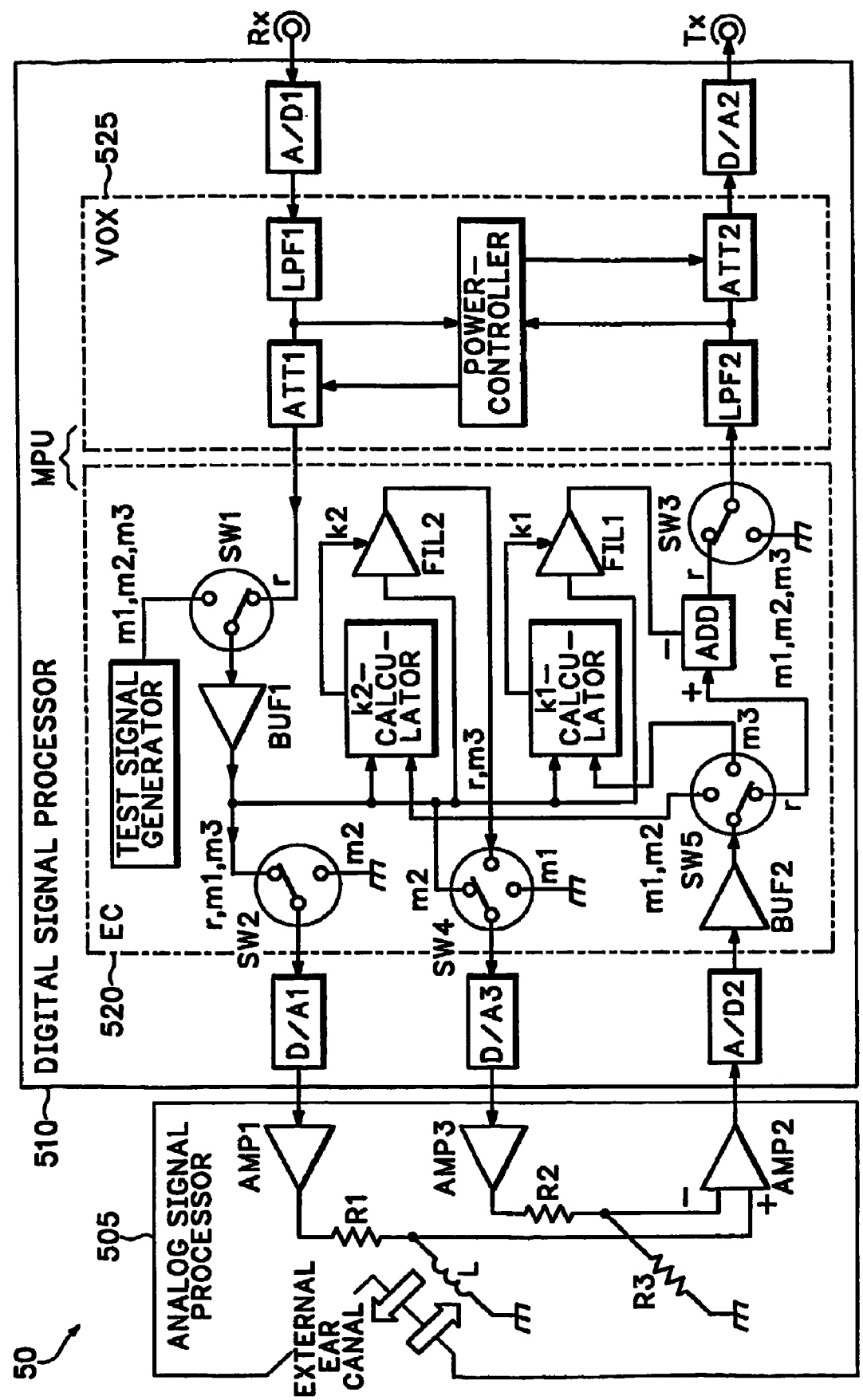
FIG. 5 is a block diagram illustrating a half-duplex, two-way communications device according to a different embodiment of the invention.

FIG. 5 is a block diagram illustrating a half-duplex, two-way communications device 50 according to another embodiment of the invention. In this embodiment, the ASP 505 and the DSP 510 are equivalent to ASP 205 and DSP 210 shown in the full-duplex, two-way communications device 20 of FIG. 2. Thus, a half-duplex, two-way communications device 50 of still-higher echo-cancellation quality than device 40 of FIG. 4 may be obtained.

Figure 6:
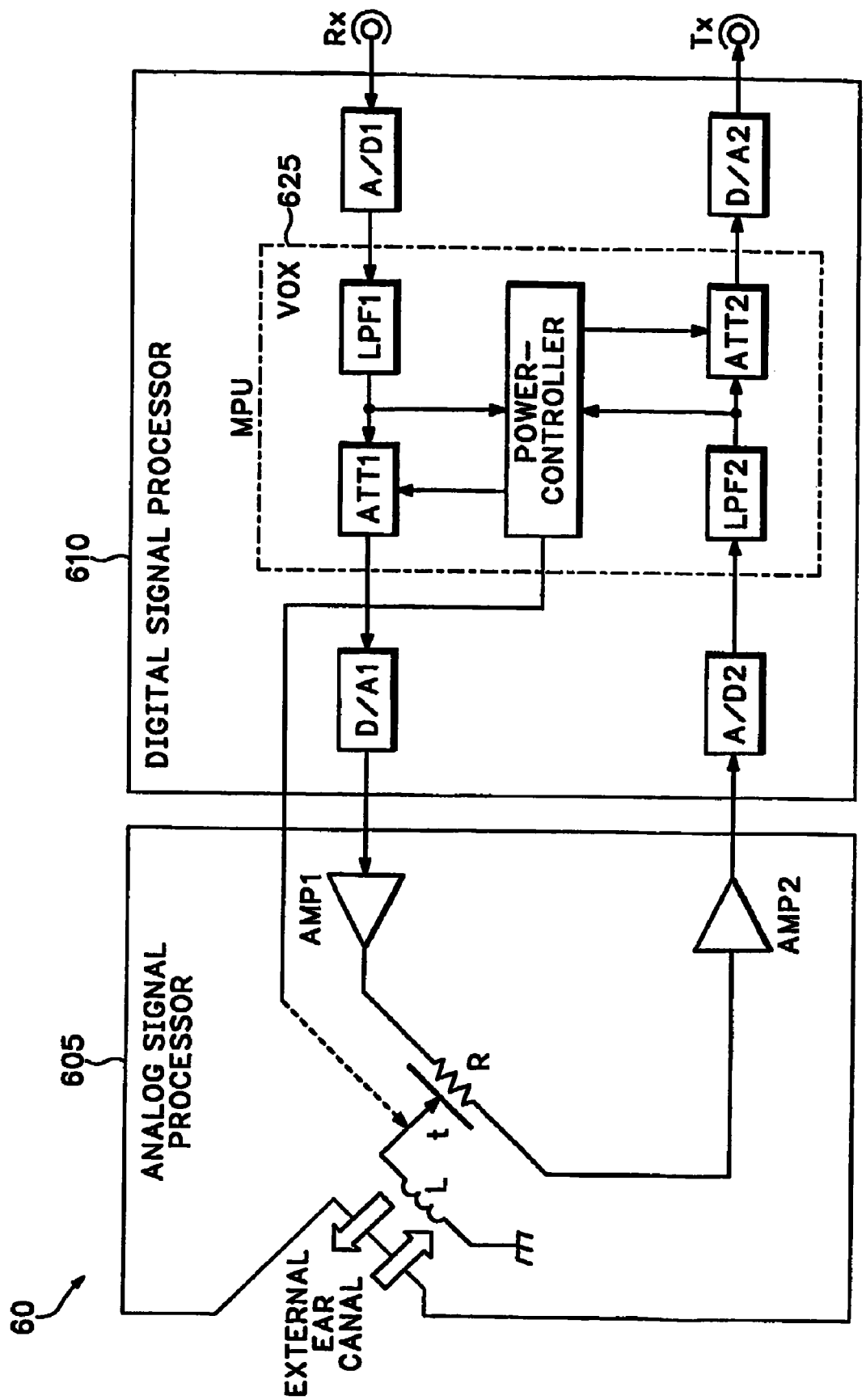
FIG. 6 is a block diagram illustrating a half-duplex, two-way communications device according to another different embodiment of invention.

FIG. 6 is a block diagram illustrating a half-duplex, two-way communications device 60 according to another embodiment of invention. This embodiment provides an ASP 605 that is simplified compared with the ASP 305 of FIG. 3.

In this embodiment, the ASP 605 includes a variable resistor R having an intermediate tap t. The position of the intermediate tap t are controlled by digital signals. One end of the piezoelectric transducer L is grounded, while the other end is connected to the intermediate tap t.

One end of the variable resistor R receives reception signals, namely the output of a converter D/A1 of the DSP 610 via a first amplifier AMP1. The other end of the variable resistor R is connected to a converter A/D2 of the DSP 610, and outputs transmission signals from the ASP 605 via a second amplifier AMP2.

The DSP 610 further includes a VOX 625, a converter A/D1, and a converter D/A2. The converters A/D1 and D/A2 are both equivalent to those shown in FIG. 3, but the power-controller of VOX 625 is further equipped with a third output for controlling the position of the intermediate tap t of the variable resistor R.

The DSP 610 provides a VOX 625 that is similar to VOX 325 in FIG. 3. An echo-cancellation function is provided by varying the position of the intermediate tap t using the third output of the power-controller. The position of the intermediate tap t is moved toward the output node of the first amplifier AMP1 in reception mode, and moved toward the input node of the second amplifier AMP2 in transmission mode. The intermediate tap t is moved from one node toward the other node according to a predetermined tap-position transition curve for switching.

If the position of the intermediate tap t is changed from an existing position to a desired final position (one end or the other end of the variable resistor R), a cumulative effect is provided to plural selections made during the time interval T1, similar to the case of the gain of the attenuators ATT1 and ATT2 that was described above with reference to FIG. 3.

That is to say, if the decision to switch to the reception (or transmission) mode continues, the position of the intermediate tap t continues to move towards one end (or the other end) according to a predetermined tap-position transition curve. If the decision is changed to switch to the opposite transmission (or reception) mode, the position moves back towards the opposite end (or the first end) according to a predetermined tap-position transition curve.

Similar to the gain-transition curves S1 and S2 of FIG. 9(a), the predetermined tap-position transition curves can also be of an S-shaped-staircase type. That is, the tap position change per unit decision is small near the final value 0 or 1, while it is large in the intermediate range. Alternatively, the predetermined tap-position transition curves may include those of the linear-staircase-type, such as curves L1 to L4 of FIG. 9(a).

When translating the gain-transition curves of FIG. 9(a) to a tap position for the tap t of FIG. 6, the attenuator gains (0 dB, −20 dB, −40 dB, etc.) in the vertical axis should be read as the tap-position coordinates of appropriate scales. For example, as one end, the center, and the other end of the variable resistor R.

At the time of selection, in order to switch between the reception/transmission mode so that conversation is exchanged naturally, the most appropriate combination among the curves should be adopted for the tap position, for the ATT1 gain, and/or for the ATT2 gain.

Figure 7:
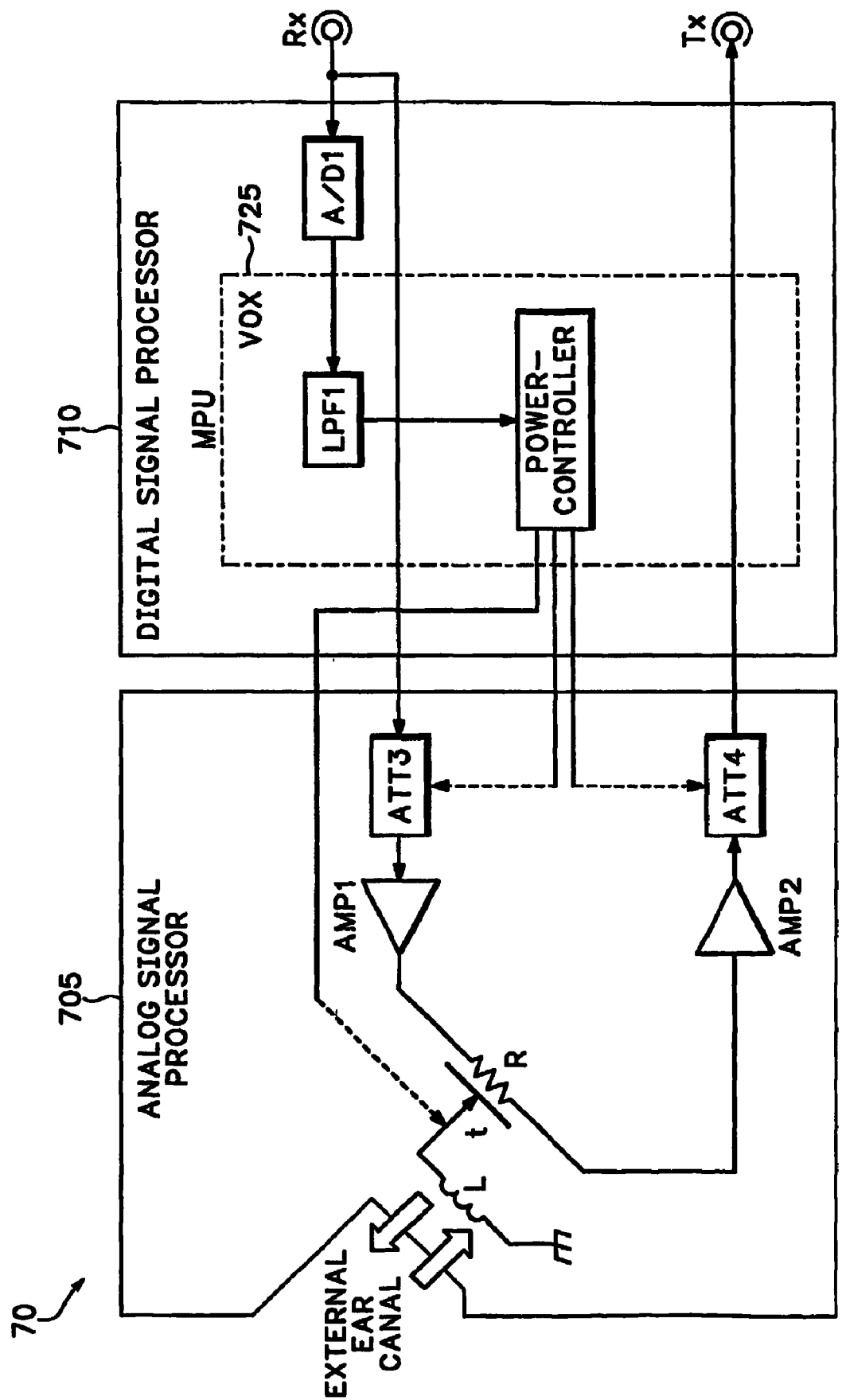
FIG. 7 is a block diagram illustrating a half-duplex, two-way communications device according to yet another different embodiment of the invention.

FIG. 7 is a block diagram illustrating a half-duplex, two-way communications device 70 according to yet another different embodiment of the invention. This embodiment provides simpler structures to replace both the ASP 305 and the DSP 310 of FIG. 3. In this embodiment, the ASP 705 includes a variable resistor R having an intermediate tap t. One end of the piezoelectric transducer L is grounded, while the other end is connected to the intermediate tap t. One end of the variable resistor R is directly connected to the reception terminal Rx via a first amplifier AMP1 and a first analog attenuator ATT3. The other end of the variable resistor R is directly connected to the transmission terminal Tx via a second amplifier AMP2 and a second analog attenuator ATT4. The position of the intermediate tap t of the variable resistor R and the gains of the first and the second analog attenuators ATT3 and ATT4 may be controlled by digital signals.

The DSP 710 includes a converter A/D1 and an MPU. The MPU has a VOX 725 that includes a low-pass filter LPF1 and a power-controller. The VOX 725 receives and monitors reception signals from the reception terminal Rx via the converter A/D1 and the low-pass filter LPF1. The VOX 725 determines the presence or absence of a reception signal and decides whether to switch to reception mode (earphone mode) or to transmission mode (microphone mode). The VOX 725 then accordingly controls the gains of the first and the second analog attenuators ATT3 and ATT4 as well as the position of the intermediate tap t.

The power-controller averages (for example, square-averages or absolute-value-averages) the amplitude values of the reception signal during a predetermined time period (T1) to determine the signal power. The power values are then compared with a predetermined threshold to determine the presence or absence of a reception signal. The VOX selects the next operation mode based on the comparison.

If the reception mode is selected, the gains of the attenuator ATT3 and the attenuator ATT4 are each changed toward 1 and toward 0, respectively, while the position of the intermediate tap t is changed towards one end of the variable resistor R. If the transmission mode is selected, the above-mentioned gains and position are changed in an opposite manner.

Similar to device 60 of FIG. 6, the transition curves of the gains of the analog attenuators ATT3, ATT4, and the position of the intermediate tap t are selected and decided to communicate and switch voices in a natural manner.

Figure 8:
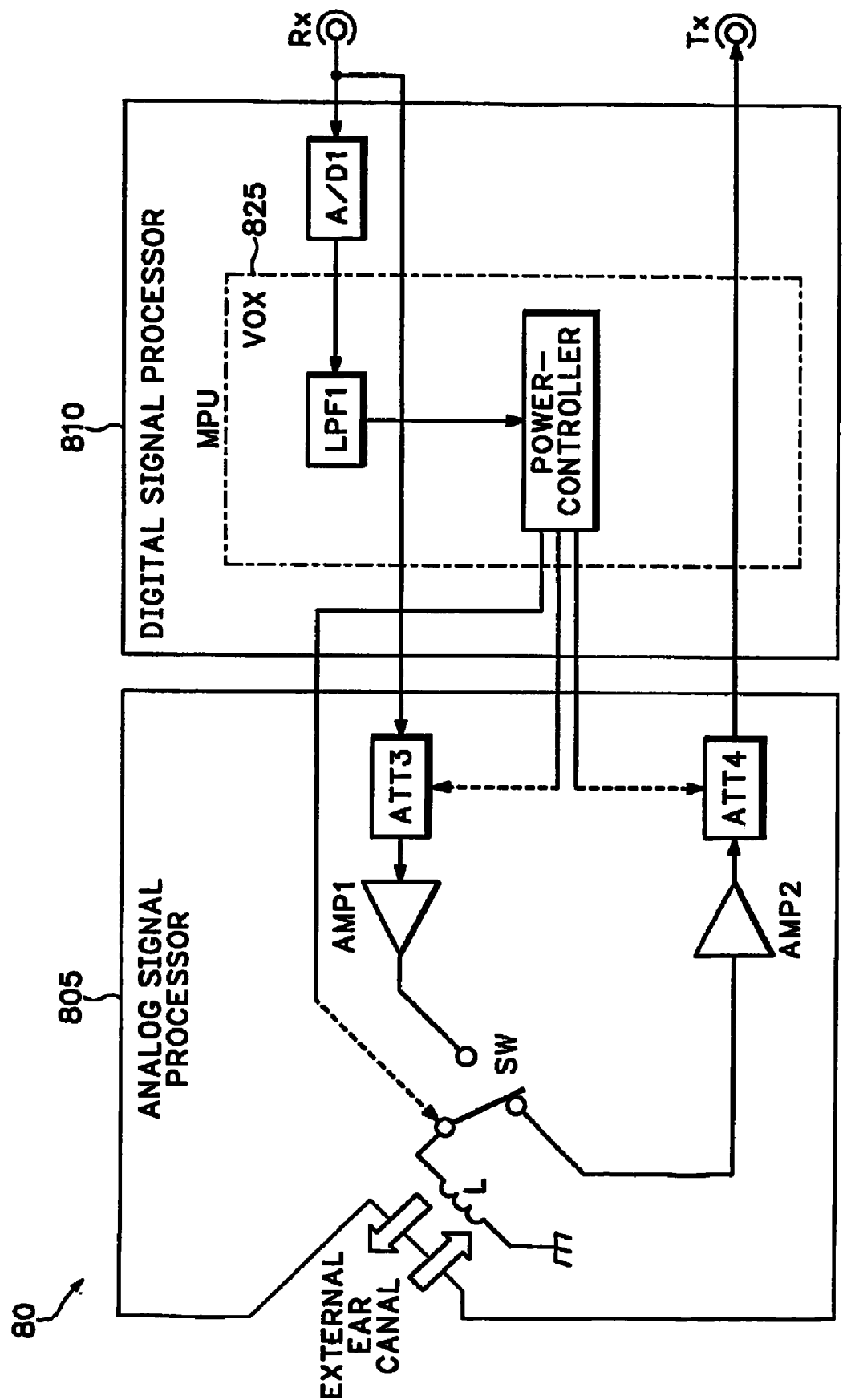
FIG. 8 is a block diagram illustrating a half-duplex, two-way communications device according to still another different embodiment of the invention.

FIG. 8 is a block diagram illustrating a half-duplex, two-way communications device 80 according to yet another embodiment of the invention. This embodiment provides an even simpler ASP 805 to replace the ASP 705 of FIG. 7.

In this embodiment, the variable resistor R, which has the intermediate tap t in FIG. 7, is replaced by a switch SW. The operation described below prevents superimposing voice signals or the switching noise of the switch SW when switching from transmission to reception mode. The gain of the second analog attenuator ATT4 is first changed from 1 to 0 according to a predetermined transition curve. The switch SW is then switched from transmission to reception. Finally the gain of the first analog attenuator ATT3 is changed from 0 to 1 according to a predetermined transition curve.

If switching from reception to transmission mode, the switching operations outlined above are performed in the reverse order. The position of the switch SW is controlled by a digital signal from the power controller in the voice-operated exchanger of the digital signal processor 810.

The above embodiments of the invention address the problem described below. Generally speaking, the voice picked up at an eardrum, that is, a speaker's voice that is detected via the vibrations of the speaker's eardrum membrane by air transmission, suffers more attenuation at higher frequencies, than does a voice detected at the speaker's mouth. For example, the attenuation can be as high as 10 dB at 2,000 Hz, while there is practically no attenuation at the lower frequencies (up to about 1,000 Hz). Therefore, the voice detected in the eardrum might be of significantly bad quality, with the result that especially explosive sounds are difficult to hear.

The embodiments of the invention described above solve this problem by adding a corrective filter to the DSP. That is, in the processing path for the transmission signal of the VOXs 125-625 shown in FIGS. 1-6, the output of the second low-pass filter LPF2 is transmitted, via the above-mentioned corrective filter, to the attenuator ATT2 and to the power controller. Frequency characteristics of the gain of the corrective filter are then set to balance the above-mentioned difference.

Still other embodiments of the invention solve this attenuation problem by providing a half-duplex, two-way communications device that represent slight modifications of FIGS. 7 and 8. These alternative embodiments add a corrective filter to the DSPs 710 and 810, along with an additional A/D converter and a D/A converter. In other words, the output of the analog attenuator ATT4 of FIG. 7 and FIG. 8 is transmitted, not directly, but through a converter A/D2 (not shown), through the corrective filter (not shown), through the converter D/A1, and finally to the transmission terminal Tx.

Figure 10B:
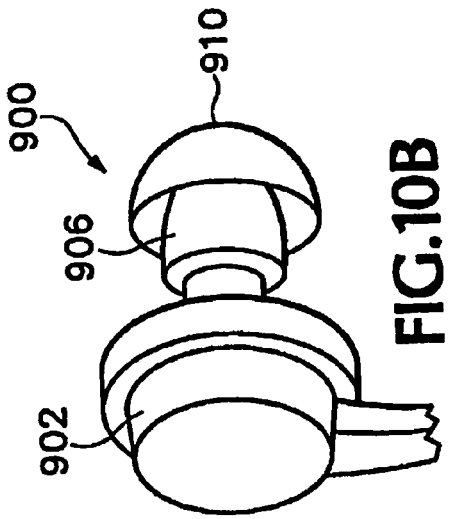
FIGS. 10A-10C show one example of a ear plug that can be used with any of the described two-way communication devices.
Figure 10C:
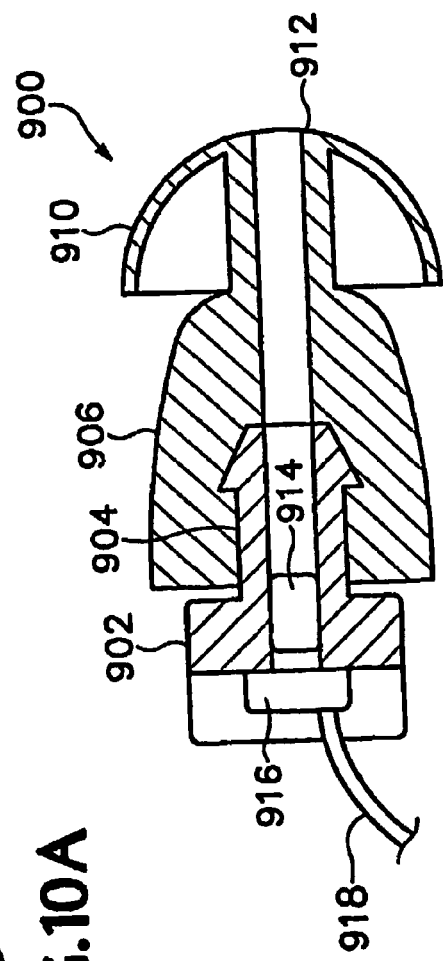
Figure 10A:
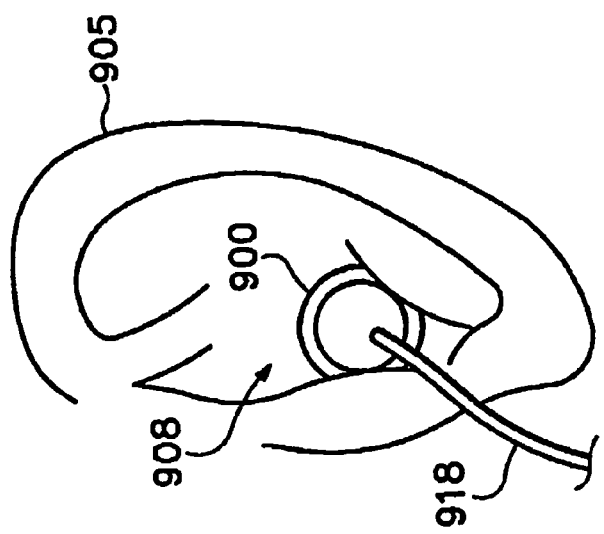

FIGS. 10A-10C are views of an earpiece 900 designed for containing any of the embodiments of the two-way communication device described above. The earpiece 900 includes a nipple 906 that penetrates into and fits snuggly within the external ear canal 908 of a user's ear 905. The nipple 906 includes an umbrella-like shroud 910 made of a soft, flexible material that conforms to the shape of the external auditory canal 908. The pinnacle of the shroud 910 has an opening 912 that allows air to pass to the transducer in the analog signal processor 914 within the housing 902.

FIG. 10C shows a cross-sectional view of the nipple earpiece shown in FIGS. 10A and 10B. The nipple 906 snaps onto an extension 904 of the earpiece housing 902 that houses the transducer and other analog signal processing circuitry 914. The digital signal processor 916 is also contained in the housing 902. The digital signal processor 916 is connected to the analog signal processor 914 and also connected to wires 918 that carry the reception and transmission signals.

It is important to note that the earpiece shown in FIGS. 10A-10C represents only one example of the many possible configurations in which the circuit configurations described above may be incorporated. While some of these configurations include a single earpiece that inserts into the external ear canal of a user's head, it is also possible to implement the two-way communication circuitry in a headset that includes a pair of earpieces that are held to the user's head with a band.

A two-way communications device according to embodiments of the invention is small and economical and also provide numerous advantageous features. A voice signal can be transmitted and received clearly, even in an environment that is very noisy and/or under adverse conditions such as strong wind and rain. Because this device uses only one of the user's ears, the user can freely use his or her hands, mouth, and the other ear. Therefore, even when a person is using this device, he or she can hear and talk with people who are nearby, and can hear ambient sounds emitted around him or her. Accordingly, this device is the most suitable for complicated and dangerous work, for example, that associated with operation of a vehicle or machine.

In light of the above descriptions of the preferred embodiments of this invention, it will be apparent to one of skill in the art that other embodiments incorporating the above described concepts may also be created. Thus, the embodiments of the invention are not limited to the embodiments disclosed above, but rather should be limited only by the spirit and scope of the invention as defined in the following claims.

The invention claimed is:

1. A two-way communication device comprising:
   an analog signal processor configured to insert in or close to an ear canal and having a first analog input for receiving a reception signal containing electrical audio signals, a second analog output for outputting a transmission signal containing electrical audio signals, the analog signal processor further comprising a bridge circuit configured to provide a first echo cancellation operation and including a transducer configured to convert the reception signal at the first analog input into acoustic wave vibrations in the ear canal and further configured to convert acoustic wave vibrations received from the ear canal into the transmission signal at the second analog output; and
   a digital signal processor (DSP) having a first digital output coupled to the first analog input of the analog signal processor and a second digital input coupled to the second analog output of the analog signal processor, the DSP configured to measure operating characteristics of an electronic signal path through the transducer and the bridge circuit in the analog signal processor by comparing the reception signal input into the transducer by the DSP through the first analog input with the transmission signal output by the same transducer from the second analog output responsive to the reception signal, the DSP further configured to use the measured operating characteristics to provide a second echo cancellation operation to filter reception signal echo from the transmission signal not filtered by the first echo cancellation operation provided by the analog signal processor.

2. The device of claim 1 wherein the bridge circuit further comprises:
   a first node coupled to the first analog input of the analog signal processor and coupled to a first end of a first resistor;
   a second node coupled to a first end of the transducer, a second end of the first resister, and a first input of a differential amplifier; and
   a third node coupled to a second end of the transducer through a second resistor and coupled to a second input of the differential amplifier.

3. The device according to claim 2 wherein the digital signal processor includes a filter that applies filter coefficients generated by a filter coefficient calculator to the reception signal to generate a filter output signal, the digital signal processor further including an adder coupled at a first end to the ouput of the differential amplifier and coupled at a second end to the filter and configured to apply the filter output signal to the transmission signal output from the differential amplifier.

4. The device according to claim 2 wherein the bridge circuit further comprises a first resistor-capacitor filter coupled between the first and third nodes and a second resistor-capacitor filter coupled between the second and third nodes.

5. The device according to claim 1 wherein the digital signal processor monitors the operating characteristics of the transducer while the transducer is located in an external ear canal.

6. The device according to claim 1 wherein the digital signal processor periodically measures the operating characteristics of the transducer while in operation and uses the periodic measurements to continuously adjust the filtering of the reception signal echo from the transmission signal.

7. The device according to claim 1 wherein the digital signal processor includes a voice operated exchanger (VOX) controlling attenuation of the reception signal and the transmission signal according to predetermined gain values.

8. The device according to claim 7 including:
a first analog to digital converter (A/D) converting the reception signal received by the VOX;
a first low pass filter filtering the A/D converted reception signal;
a first attenuator attenuating the reception signal; and
a power controller controlling attenuation of the reception signal by the attenuator according to the filtered A/D converted reception signal.

9. The device according to claim 8 including a second attenuator attenuating the transmission signal output from the analog signal processor according to the power controller.

10. The device according to claim 9 including a second low pass filter receiving the transmission signal from the analog signal processor and sending a filtered transmission signal to the second attenuator, the power controller controlling attenuation of the filtered transmission output signal according to a power level of the filtered transmission signal or power level of the filtered reception signal.

11. The device according to claim 7 wherein the digital signal processor further includes an echo canceller (EC) receiving the reception signal from the VOX and outputting the transmission signal with reception signal echo cancellation to the VOX.

12. The device according to claim 11 including:
a first analog to digital converter (A/D) operating between a reception terminal and the VOX;
a first digital to analog converter (D/A) operating between the reception signal output from the EC and the analog signal processor;
a second A/D converter operating between the transmission signal output from the analog signal processor and the EC; and
a second D/A converter operating between the transmission signal output from the VOX and a transmission terminal.

13. The device of claim 12 wherein the echo canceller includes:
a first buffer with an output coupled to both an input of the first D/A converter and an input of a compensation filter;
a second buffer with an input coupled to an output of the second A/D converter, wherein the compensation filter is configured to simulate transmission characteristics along a signal path starting at the input of the first D/A converter, passing through the transducer in the analog signal processor, passing out from the same transducer through the second A/D converter, and ending at an output of the second buffer; and
an adder configured to subtract an output of the compensation filter from the output of the second buffer.

14. A device according to claim 13 including:
a first switch configured to selectively provide an input of the first buffer to either the voice-operated exchanger or a test signal generator;
a parameter calculator receiving the outputs of the first and second buffers and configured to set the parameters of the compensation filter by processing a signal from the second buffer and a test signal from the first buffer; and
a second switch configured to selectively provide an output of the adder to either the voice-operated exchanger or to a ground.

15. The device of claim 7 wherein the analog signal processor includes a four-sided bridge circuit having a first node coupled to the reception signal output from the digital signal processor and coupled to a first end of the transducer through a first resistor, and having a second node coupled to a second end of the transducer through a second resistor and outputting the transmission signal to the digital signal processor.

16. The device according to claim 15 wherein the analog signal processor includes a first amplifier coupled between the first node and the reception signal output from the DSP and a second differential amplifier coupled to the first and second nodes of the bridge circuit and outputs the transmission signal to the DSP.

17. The device of claim 15 wherein the bridge circuit includes:
a first side having a third resistor coupled in series with a first capacitor and both coupled in parallel with the transducer;
a second side having the first resistor;
a third side having a fourth resistor connected in parallel with a second capacitor; and
a fourth side having the second resistor.

18. The device according to claim 7 wherein the analog signal processor includes a variable resistor having a first end coupled to the reception signal output from the digital signal processor and a second end coupled to the transmission signal output to the digital signal processor and a center tap coupled to the VOX, the center tap moved toward the first end or second end by the VOX according to a selected reception mode or selected transmission mode.

19. In a two-way communication device comprising a digital signal processor and an analog signal processor with a transducer that is designed to be inserted into an ear canal, a method comprising:
configuring a first filter in the digital signal processor to simulate a input voltage generated by the analog signal processor with a large amplitude;
configuring a second filter in the digital signal processor to simulate an input voltage generated by the analog signal processor with a small amplitude, wherein the second filter further simulates a signal path through the analog signal processor for determining characteristics in the signal path between an input and output of a same transducer by comparing a first electrical audio test signal input into the transducer with a second electrical audio test signal output from the same transducer responsive to the first electrical audio signal; and
subtracting an output of the second filter from an output of the analog signal processor to substantially cancel an echo component present in the output of the analog signal processor.

20. The method of claim 19, further comprising:
configuring the first and second filter in the digital signal processor to simulate the different signal paths through the analog signal processor comprising:
generating a test signal;
propagating the test signal through the different signal paths while the transducer is placed in an external ear canal; and
setting parameters of the first and second filter based on characteristics of the propagated test signals through the different signal paths.

21. The method of claim 20, wherein generating the test signal comprises:
generating a test signal chosen from the group consisting of a digital signal that corresponds to any one of the following: an impulse, an actual voice during conversation, a natural voice, a reception sound, or a musical sound; a diffusion code signal, and a tone sweep signal.

22. The method of claim 19 including reconfiguring the first and second filter after a predetermined amount of time to compensate for a variation of the acoustic conditions of the ear canal.

23. In a two-way communication device comprising a digital signal processor and an analog signal processor, the analog signal processor including a transducer that is designed to be inserted into an ear canal, a method comprising:
    transmitting a first test signal through a first signal path in the analog signal processor;
    generating a first set of filter coefficients from the first test signal that simulate signal transmission characteristics through the first signal path;
    transmitting a second test signal through a second signal path in the analog signal processor;
    generating a second set of filter coefficients from the second test signal that simulate signal transmission characteristics through the second signal path;
    combining the first set of coefficients with the second set of coefficients in a first filter in the digital signal processor to simulate a response of a large amplitude signal through the first signal path and the second signal path through the analog signal processor;
    transmitting a third test signal through the first signal path and through a third signal path, wherein the third signal path includes the first filter and the second signal path;
    generating a third set of coefficients from the third test signal;
    using the third set of coefficients in a second filter located in the digital signal processor to simulate a response of a small amplitude signal through the analog signal processor;
    transmitting a receive signal through the first signal path and the third signal path; and
    subtracting an output of the second filter from an output of the analog signal processor to substantially cancel an echo component present in the output of the analog signal processor.

24. The method of claim 23 including
    a differential amplifier having a first input coupled to the first signal path, a second input coupled to the second signal path, and an output comprising the output of the analog signal processor.

25. The method of claim 24 including:
    propagating the first test signal through the first signal path while an input to the second signal path is grounded, wherein the first signal path includes a first amplifier, the transducer, a first resistor, and the first input of the differential amplifier;
    propagating the test signal through the second signal path while an input to the first signal path is grounded, wherein the second signal path includes a third amplifier, second and third resistors, and the second input of the differential amplifier; and
    setting parameters of the first filter based on characteristics of the propagated first and second test signals and wherein the first filter simulates an input voltage at the second amplifier with a the large amplitude and the second filter simulates the input voltage at the second amplifier with the small amplitude.

26. The method of claim 24 including generating the test signals from a group consisting of a digital signal that corresponds to any one of the following: an impulse, an actual voice during conversation, a natural voice, a reception sound, or a musical sound; a diffusion code signal, and a tone sweep signal.

27. The method of claim 23 including:
    inserting the transducer into the ear canal;
    periodicially transmitting each of the first, second, and third test signals through the analog signal processor while the transducer is inserted into the ear canal;
    periodically generating new first and second sets of coefficients for the first filter responsive to the periodically transmitted first and second test signals; and
    periodically generating new third sets of coefficients for the second filter responsive to the periodically transmitted third test signal.

28. A two-way communications device comprising:
    a piezoelectric transducer, wherein the piezoelectric transducer is configured to detect vibrations of an eardrum membrane caused by sound waves, and wherein the piezoelectric transducer is also configured to transmit a sound wave to the eardrum membrane;
    a housing shaped like an earplug that is configured to contain the piezoelectric transducer; and
    an echo-canceller configured to model the variable acoustic characteristics of the piezoelectric transducer caused by the eardrum membrane and an ear canal associated with the eardrum membrane, wherein the echo-canceller comprises:
    a first buffer with an output coupled to both an input of a first D/A converter and an input of a first compensation filter;
    a second buffer with an input coupled to an output of a second A/D converter, wherein the compensation filter is configured to simulate transmission characteristics along a signal path starting at the input of the first D/A converter, passing through the piezoelectric transducer, passing out from the same piezoelectric transducer through the second A/D converter, and ending at an output of the second buffer; and
    an adder configured to subtract an output of the compensation filter from the output of the second buffer.

* * * * *